Sept. 22, 1931.  G. RAUSCH  1,824,408

LOAF FORMING MACHINE

Original Filed Dec. 20, 1929

Inventor:
G. Rausch
by Sydney Prescott
Atty

Patented Sept. 22, 1931

1,824,408

UNITED STATES PATENT OFFICE

GOTTFRIED RAUSCH, OF AMMENDORF, NEAR HALLE ON SAALE, GERMANY

LOAF FORMING MACHINE

Application filed December 20, 1929, Serial No. 415,591. Renewed April 21, 1931.

My invention relates to improvements in loaf forming machines, especially to those for coiling cornicles, in which the coiling of the dough is performed by means of rollers without the use of endless aprons or the like. In one type of these coiling machines hitherto known several coiling rollers are provided which are resiliently, slidably, or pivotally mounted. In another type slidable or swinging coiling rollers are entirely dispensed with. The first type is rather complicated, the drive of displaceable rollers being very difficult as the distance and location of their axes alters during work. In the latter type of machines the quality of the cornicles formed is poor. For by the omission of resilient, slidable or swinging rollers many of the cornicles are not sufficiently coiled, furthermore they are shorter than those furnished by machines with movable rollers.

The object of the invention is a cornicle coiling machine in which the coiling is effected between an admission roller, a fixed roller and a pivotally mounted roller, the weight of the latter being compensated in such manner, that the pressure of this pivoted roller on the dough decreases steadily with the growing cornicle. By this arrangement the coiling of the dough is improved in surprising extent. During the coiling the cornicle is embraced entirely by three rollers forming a more or less closed triangular space in which the dough is entirely coiled in any case. As the pressure of the coiling roller is initially high and then decreasing, the first coils of the growing cornicle are spread to a remarkably greater extent. As soon as the coiling of the cornicle is finished the swinging roller opens one side of the triangular coiling space and expels automatically the finished cornicle.

The drawings show by way of an example a cornicle coiling machine according to the invention.

Figures 1, 2:
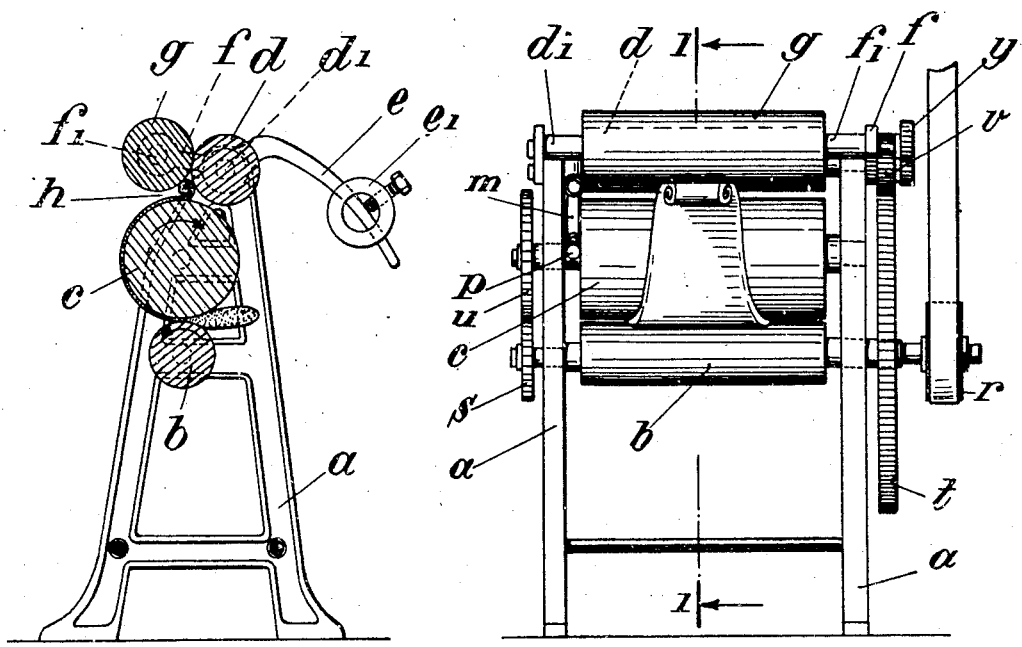
Fig. 1 is a front elevation of the machine.
Fig. 2 is a section on the line 1—1 of Fig. 1.
Figure 3:
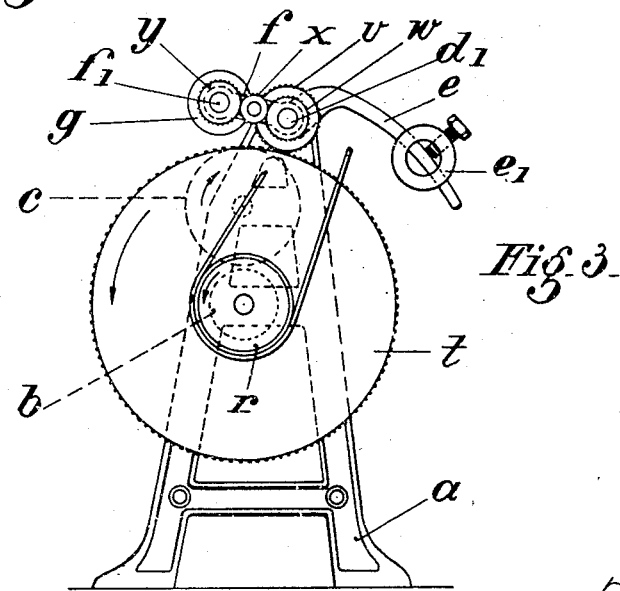
Fig. 3 is a side elevation showing the gearing.

The two uprights of the frame $a$ have the bearings for three rollers, i. e. a sheeting roller $b$, a principal or admission roller $c$ and a coiling roller $d$. A pulley $r$, fixedly attached to the shaft of the roller $b$ rotates the roller $d$ by means of the gearing $t$, $v$ and the roller $c$ by means of the gearing $s$, $u$ in opposite direction to the roller $b$. A two-armed lever pivoted freely on the axis $d_1$ of the roller $d$ carries on its arm $f$ a roller $g$ rotating on an axis $f_1$. The roller $g$ is driven in the same direction as roller $d$ by means of a gearing $w$, $x$, $y$. The other arm $e$ of the lever, preferably curved as shown, has a counterweight $e_1$ adjustably mounted on said arm to partly balance the weight of the roller $g$. The form and position of the lever $e$, $f$ is such, that, when the roller $g$ is swung upward by the growing cornicle so that its pressure is gradually decreased as the horizontal distance between its axis and the axis $d_1$ is decreased.

As the horizontal distance between the axis of the roller $g$ and the axis $d_1$ is decreased the moment, or in other words, the pressure of the roller $g$ on the cornicle is correspondingly decreased. The horizontal distance between the counterweight $e_1$ and the axis $d_1$ is likewise decreased and its balancing action on the roller $g$ is diminished; but, since it only partly balances the roller $g$ this decrease in counterbalancing action is not sufficient to compensate for the decrease in pressure of the roller $g$ on the cornicle.

The dough is admitted to the rollers $b$ and $c$ and sheeted by passing between them: The main roller $c$ carries the sheet of flat dough upward into the triangular coiling space bordered by the two fixed rollers $c$ and $d$ and the swinging roller $g$. As the roller $g$ is raised by the growing cornicle, its pressure on the same decreases steadily, as the horizontal distance between $b_1$ and $d_1$ decreases. By using a high initial pressure during the coiling, the first windings of the cornicle are spread and the length of the cornicle is increased. For the subsequent windings, a smaller pressure is desirable as the windings become narrower toward their outer end. The coils of the cornicle should be wound on each other as loosely as possible, so that they may be well distinguished after the cornicle is baked; a decreasing pressure avoids pressing the coils into each other out of shape. By relieving the pressure of the coiling roller, the removal of the cornicle is facilitated at the end of the operation.

I claim:

1. In a loaf forming machine, the combination with a principal roller, of a sheeting roller cooperating therewith to roll a piece of dough into a sheet, a coiling roller cooperating with said principal roller to coil the sheet of dough, a two armed lever pivoted on the axis of said coiling roller, a coiling roller mounted in one arm of said lever and cooperating with the first coiling roller, and an adjustable counterweight mounted on the other arm of said lever, whereby said last mentioned coiling roller engages the coil of dough with a pressure which decreases as the size of the coil increases.

2. In a loaf forming machine, the combination with a principal roller, of a sheeting roller cooperating therewith to roll a piece of dough into a sheet, a coiling roller cooperating with said principal roller to coil the sheet of dough, a two armed lever pivoted on the axis of said coiling roller, a coiling roller mounted in one arm of said lever and cooperating with the first coiling roller, and an adjustable counterweight mounted on the other arm of said lever, whereby said last mentioned coiling roller engages the coil of dough with a pressure which decreases as the size of the coil increases, said sheeting roller being positively driven and said principal and coiling rollers being driven from said sheeting roller.

3. The combination with a principal roller, of a coiling roller cooperating therewith to coil a sheet of dough, a two armed lever pivoted on the axis of said coiling roller, a second coiling roller mounted on one arm of said lever and cooperating with the first coiling roller, and an adjustable counterweight mounted on the other arm of said lever, whereby said second coiling roller engages the coil of dough with a pressure which decreases as the size of the coil increases.

In testimony whereof I affix my signature.

GOTTFRIED RAUSCH.